United States Patent [19]

Sumner

[11] 3,927,975
[45] Dec. 23, 1975

[54] SYSTEM FOR SUPPRESSING LIQUID SULFUR TRIOXIDE

[75] Inventor: Clark A. Sumner, Santa Ana, Calif.

[73] Assignee: Stauffer Chemical Company, Westport, Conn.

[22] Filed: Aug. 26, 1974

[21] Appl. No.: 500,216

[52] U.S. Cl. ................. 21/60.5; 23/293; 23/293 S; 252/319
[51] Int. Cl.² ........................................... B01J 1/18
[58] Field of Search ........... 23/293, 293 S; 423/532; 21/60.5; 252/319, 381, 382, 383, 384

[56] References Cited
UNITED STATES PATENTS 1,814,053   7/1931   Mueller ........................... 21/60.5 X

FOREIGN PATENTS OR APPLICATIONS 752,345   7/1956   United Kingdom ................. 21/60.5
752,346   7/1956   United Kingdom ................. 21/60.5

Primary Examiner—Morris O. Wolk
Assistant Examiner—Michael S. Marcus
Attorney, Agent, or Firm—Daniel C. Block

[57] ABSTRACT

A system is provided to seal over the surface of liquid sulfur trioxide so as to prevent reaction with moisture vapor in the air to form sulfuric acid aerosol commonly referred to as "smoke". This is brought about by adding an inert immiscible oil slurried with glass bubbles to reduce the specific gravity of the oil-slurry so that it will float on and seal the surface of the liquid sulfur trioxide.

4 Claims, No Drawings

SYSTEM FOR SUPPRESSING LIQUID SULFUR TRIOXIDE

BACKGROUND OF THE INVENTION

It has long been recognized that liquid sulfur trioxide is a most efficient reagent for a wide variety of organic sulfations and sulfonations. It has distinct advantages over chlorosulfonic acid, sulfuric acid or oleum, where the large excess used is lost to the process as spent acid which must either be returned to the manufacturer or disposed of by the sulfonator.

In normal use, the liquid sulfur trioxide is stored in large volume tanks that are constructed within a shelter or housing wherein the temperature can be controlled. The reason for this control of the temperature is the fact that at temperatures below about 90°F., liquid sulfur trioxide will freeze. Thus, the temperature within these structures is maintained at approximately 95° to 110°F. It is the recommended practice, for safety reasons, that a sump be within or adjacent to the storage tank, capable of holding the tank's total volume, so that should there be a failure of the storage tank, or of its piping, the liquid sulfur trioxide would be contained in the sump.

It is possible that the large volume storage tank containing the liquid sulfur trioxide will rupture and a spill will occur. If this occurs, the released liquid sulfur trioxide will react with the moisture vapor contained in the air to release large volumes of "smoke" which is an aerosol of sulfuric acid. This smoke obscures the cause of the leak and can result in the evacuation of large areas downwind of the spill. Thus, it becomes necessary to immediately control the emission of this smoke.

In the past, it has been the recommeded practice to control the formation of this smoke by blowing substantial quantities of foam onto the spill. Since this foam contains water, sulfuric acid aerosol and sulfuric acid mist are generated in substantially greater volumes than if nothing is added, but the length of time smoke is present, is substantially reduced. When the foam is added onto liquid sulfur trioxide, violent explosions also occur which damage the structure and spatter liquid sulfur trioxide over a large area.

Another system recommended for controlling smoke is to apply water from a high pressure fog nozzle. Here again the volume of smoke generated is substantially increased and it too consists of sulfuric acid aerosol and sulfuric acid mist. It takes much longer for fogged water to suppress smoke generation than when foam is used.

These systems presently recommended for controlling the emission of smoke unfortunately have to be carried to completion so that all of the sulfur trioxide is converted to sulfuric acid, sulfuric acid mist, and sulfuric acid aerosol. This complete conversion necessarily results in tremendous releases of this dense-white smoke with its attendant problems associated with evacuation of large areas.

DESCRIPTION OF THE INVENTION

This invention relates to a system that will immediately prevent the reaction of the liquid sulfur trioxide with the moisture vapor in the air. In this process the large volume of $SO_3$ is not converted to sulfuric acid, sulfuric acid aerosol and sulfuric acid mist.

This system consists of blanketing or sealing the surface of the liquid sulfur trioxide in such a manner so that the moisture in the air cannot contact the liquid sulfur trioxide and react therewith to form the sulfuric acid aerosol commonly referred to as smoke.

For purposes of sealing over the surface of the liquid sulfur trioxide, it has been found in practice that a specific inert oil having specific physical properties is satisfactory. Thus, any inert halogenated carbon material, having all the hydrogen sights replaced with a halogen, with the specific gravity adjusted so that the material will float on the surface of the liquid sulfur trioxide will form a seal over the surface. Since the specific gravity of liquid sulfur trioxide ranges between 1.7 and 1.9, depending upon the temperature, the oil employed to seal over the top thereof must have a specific gravity adjusted to be less than the specific gravity of the liquid sulfur trioxide so that it will float on the top of the liquid sulfur trioxide. Moreover, the oil must be completely immiscible and non-reactive with the liquid sulfur trioxide.

It has been found in practice that linear polymers built up of a recurring unit which is

wherein X is selected from fluorine and chlorine. The terminal groups on each end of the chain are derived from the polymerization catalyst and/or the solvent employed. The terminal groups are usually fluorinated or chlorinated. These oils are commercially available and have been described for use as heat transfer media, hydraulic fluids and particularly useful as di-electric fluids in electrical applications; see, for example, Halocarbon Products Corporation Bulletin published in 1970.

Since these oils that were found to be satisfactory have too high a specific gravity and do not float on liquid sulfur trioxide, an additive is employed which may be described as any inert non-reactive material that will function to reduce the specific gravity of the inert oil and can be suspended therein to form a slurry. It is preferred to use commercially available glass bubbles having a size ranging between 10 and 160 microns for reducing the specific gravity of the particular oil. Care should be maintained, however, to insure that the viscosity profile of these slurries are such that the resulting slurry will flow. If desired, viscosity improvers, such as commercially available gelling agents, can be incorporated therein to insure stability of the suspension and to improve the flow characteristics.

It has been found in practice that the mixture of glass bubbles and oil can range between approximately ½ to 2 parts by volume oil to 1 part by volume glass bubbles. It is preferred, however, that a 1 to 1 ratio be employed.

The thickness of the blanket or seal over the top of the liquid sulfur trioxide should be held to a minimum to reduce the costs thereof. Thus, a range between ⅛ inches upwardly to about ½ inch is preferred.

In order to illustrate the merits of the present invention, the following examples are provided:

EXAMPLES

Six different samples of an inert oil that is immiscible and non-reactive with sulfur trioxide were obtained from a commercially available source. These oils are described as linear polymers built up of a recurring unit which is:

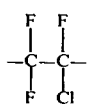

The terminal end groups are completely halogenated and inert. The number of recurring units are selected to provide the oil with specific physical properties. The physical properties are as follows:

| Sample No. | Viscosity, cs at 100°F | Specific Gravity at 100°F | Adjusted Specific Gravity |
|---|---|---|---|
| 1 | 0.8 | 1.71 | 1.21 |
| 2 | 1.8 | 1.81 | 1.23 |
| 3 | 12.2 | 1.88 | 1.23 |
| 4 | 108.0 | 1.92 | 1.24 |
| 5 | 624.0 | 1.95 | 1.24 |
| 6 | 2180.0 | 1.98 | 1.30 |

Since the specific gravity of these oils is equal or greater than liquid sulfur trioxide, these samples were diluted with about a 1 to 1 volume ratio of commercially available spherical inert hollow glass bubbles ranging in size of 10 to 160 microns. Thus, the adjusted specific gravity is also listed.

Thereafter, 140 cc of liquid sulfur trioxide were added to each of six 150 cc beakers. At the outset, large volumes of smoke occurred. Then, the slurry of the inert oils plus glass bubbles of samples 1 to 6 were poured on top of the liquid sulfur trioxide to thickness of ¼ inches. Immediately, the evolution of smoke (sulfuric acid aerosol) ceased on each of the six beakers. After 3 hours, the beaker containing samples 1, 2 and 3 began to emit smoke, sample 4 began to emit a small amount of smoke and samples 5 and 6 maintained good seals over the top of the liquid sulfur trioxide.

In a larger test recently conducted, twenty gallons of liquid sulfur trioxide were poured into a 4 × 4 foot pan, thereby exposing 16 square feet of surface area. Clouds of smoke were generated. Then, 5 gallons of the slurry composed of oil and glass bubbles, similar to Samples 5 and 6, were pumped onto the surface. Smoke generation immediately ceased. The seal so formed could be broken and it would reseal immediately. After 18 hours the seal still prevented major smoke generation. Small wisps were occasionally emitted, but were judged to be inconsequential.

As it can be seen from the above, the oils defined herein provide an excellent seal of the surface of the sulfur trioxide so that the sulfur trioxide cannot contact the moisture in the air to generate sulfuric acid aerosol commonly referred to as smoke. Moreover, the seals over the surface of the sulfur trioxide provide a mechanism wherein the sulfur trioxide can be confined for a sufficient period of time such that it can be pumped back into a tank and reclaimed for future use.

Since the specific gravity of the oil-glass bubble slurry as employed here is less than the specific gravity of the liquid sulfur trioxide so that it will float thereon and it is completely inert therewith, the oils can be applied to the liquid sulfur trioxide at any stage of the spill. That is to say, when a spill occurs, the oils can be immediately applied to the sump and any further addition of sulfur trioxide to the sump will penetrate through the oil seal with only minimum smoke generation. In any event, the sealing slurry should be applied to the liquid sulfur trioxide as soon as possible after a spill occurs to reduce the amount of smoke produced.

What is claimed is:

1. A method for substantially reducing the formation of sulfuric acid aerosol smoke from liquid sulfur trioxide after a spill of said liquid sulfur trioxide, comprising the steps of:
   a. Confining the liquid sulfur trioxide;
   b. Applying to the top surface of said liquid sulfur trioxide spill an inert non-reactive and immiscible oil which has been slurried with a predetermined amount of inert solid diluent to adjust the specific gravity thereof to less than that of liquid sulfur trioxide; said inert non-reactive and immiscible oil defined as a linear polymer having the formula

wherein X is selected from the group consisting of chlorine and fluorine.

2. The system as set forth in claim 1 wherein said inert solid diluent is present in an amount ranging between ½ to 2 parts by volume oil to 1 part by volume diluent.

3. The system as set forth in claim 2 wherein said inert solid diluent is spherical glass bubbles having a size ranging between 10 and 160 microns.

4. The system as set forth in claim 1 wherein said oil is:

* * * * *